United States Patent
Fonville et al.

(10) Patent No.: US 7,320,301 B1
(45) Date of Patent: Jan. 22, 2008

(54) CLOCK AND ANCHOR PIPE FITTING AND METHOD

(75) Inventors: Carl E. Fonville, Ann Arbor, MI (US); Dipak R. Patel, Grand Blanc, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/696,212

(22) Filed: Apr. 4, 2007

(51) Int. Cl.
*F02M 35/10* (2006.01)
*F16L 21/00* (2006.01)
(52) U.S. Cl. .................. 123/184.21; 285/401
(58) Field of Classification Search ........... 123/184.21, 123/572–574, 518; 285/360, 361, 376, 401, 285/402
See application file for complete search history.

(56) References Cited

U.S. PATENT DOCUMENTS 1,947,743 A * 2/1934 Schoeneck .................. 285/401

* cited by examiner

*Primary Examiner*—Noah P. Kamen

(57) ABSTRACT

A pipe fitting assembly is provided for an intake manifold defining a generally cylindrical bore and having at least one tab portion defining at least one groove. The pipe fitting assembly includes a fitting member having a generally cylindrical portion configured for insertion into the bore such that the fitting member is rotatable between a first and second position. At least one flange is formed on the fitting member and is operable to engage the at least one groove when the fitting member is rotated from the first position to the second position, thereby preventing the removal of the cylindrical portion from the bore. A tube member is also provided having a first end mounted with respect to the fitting member and a second end mounted with respect to the intake manifold. The tube member is operable to retain the fitting member in the second position.

12 Claims, 2 Drawing Sheets

CLOCK AND ANCHOR PIPE FITTING AND METHOD

TECHNICAL FIELD

The present invention relates to a pipe fitting for an intake manifold of an internal combustion engine.

BACKGROUND OF THE INVENTION

Pipe fittings are typically held within an intake manifold by a "clock and lock" mounting strategy. Such a strategy typically employs snap fit features on the pipe fitting and/or the intake manifold, such that the pipe fitting is inserted into the manifold and rotated or "clocked" against the bias force of a retaining feature into engagement with the locking feature, thereby locking the pipe fitting with respect to the intake manifold.

SUMMARY OF THE INVENTION

A pipe fitting assembly is provided for a component, such as an intake manifold of an internal combustion engine, defining a generally cylindrical bore and having at least one tab portion defining at least one groove. The pipe fitting assembly includes a fitting member having a generally cylindrical portion configured for insertion into the generally cylindrical bore such that the fitting member is rotatable between a first and second position. At least one flange is formed on the fitting member and is operable to engage the at least one groove when the fitting member is rotated from the first position to the second position, thereby preventing the removal of the generally cylindrical portion from the generally cylindrical bore. A tube member is also provided having a first end mounted with respect to the fitting member and a second end mounted with respect to the component. The tube member is operable to retain the fitting member in the second position.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
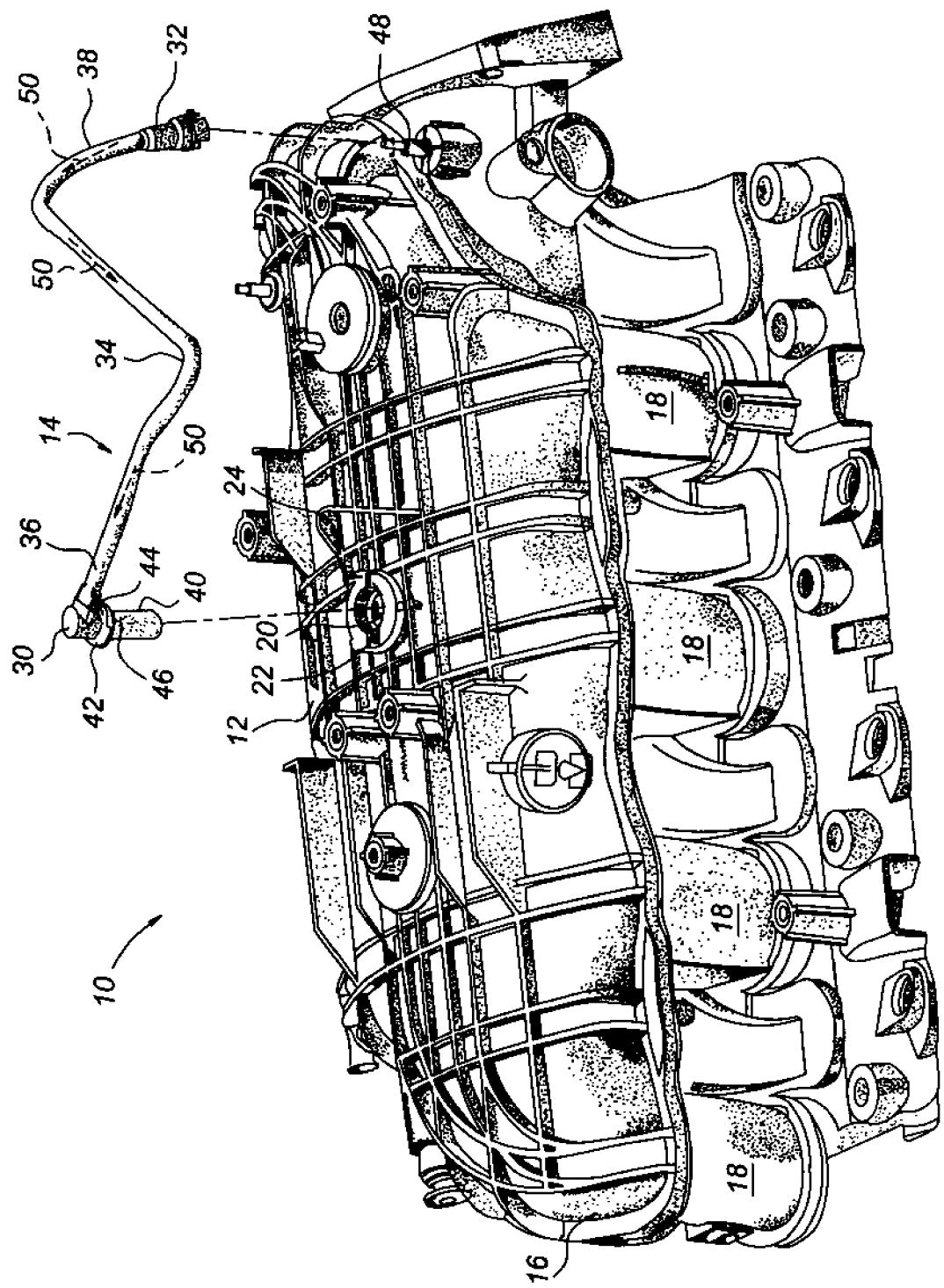
FIG. 1 is a partially exploded view of an intake manifold and a pipe fitting assembly mountable thereto.

Referring to the drawings wherein like reference numbers correspond to like or similar components throughout the several views, there is shown in FIG. 1 a component, such as an intake manifold assembly 10 for an internal combustion engine, not shown. The intake manifold assembly 10 includes an intake manifold 12 and a pipe fitting assembly 14 mountable thereto (shown separated from the intake manifold 12 in FIG. 1). The intake manifold 10 includes a plenum 16 in communication with a plurality of intake runners 18. The plenum 16 and intake runners 18 cooperate to convey intake air to the internal combustion engine. The intake manifold 12 of FIG. 1 is formed from plastic; however, the intake manifold 12 may be formed from cast metal, such as aluminum, magnesium, etc. while remaining within the scope of that which is claimed. The intake manifold 12 defines a generally cylindrical bore 20 that extends into the plenum 16. A first and second tab 22 and 24, respectively, extend from the intake manifold 12 and are provided adjacent to the generally cylindrical bore 20. The first tab 22 defines a first groove 26, shown in FIGS. 2 and 3, while the second tab 24 defines a second groove 28, also shown in FIGS. 2 and 3.

The pipe fitting assembly 14 includes a pipe fitting 30 and a quick-connect fitting 32. A tube 34 includes a first end portion 36, mounted to the pipe fitting 30, and a second end portion 38, mounted to the quick-connect fitting 32. The tube 34 is preferably formed from a semi-flexible plastic material to allow proper positioning of the quick-connect fitting 32. The pipe fitting 30 includes a generally cylindrical portion 40 sufficiently configured for insertion into the generally cylindrical bore 20. First and second flanges 42 and 44, respectively, are formed on the pipe fitting 30 and cooperate with the first and second grooves 26 and 28 of FIGS. 2 and 3 to retain the generally cylindrical portion 40 of the pipe fitting 30 within the generally cylindrical bore 20 as discussed in greater detail hereinbelow with reference to FIGS. 2 and 3. A seal 46, such as an o-ring seal, is provided on the generally cylindrical portion 40 of the pipe fitting and is operable to sealingly engage the generally cylindrical bore 20. The quick-connect fitting 32 is operable to engage a fitting 48, thereby mounting or fixing the second end portion 38 of the tube 34 with respect to the intake manifold 12. Those skilled in the art will recognize that the quick-connect fitting may be configured to mount the second end portion 38 of the tube 34 to another component, in lieu of the intake manifold 12, such as an evaporative emission purge valve, not shown.

As shown in FIG. 1, the pipe fitting assembly 14 forms a portion of an evaporative emission control system. As such, the tube 34 is configured to convey evaporative emission gases, indicated as arrows 50, from the quick-connect fitting 32 to the pipe fitting 30 for subsequent introduction to the plenum 16 of the intake manifold 12.

Figure 2:
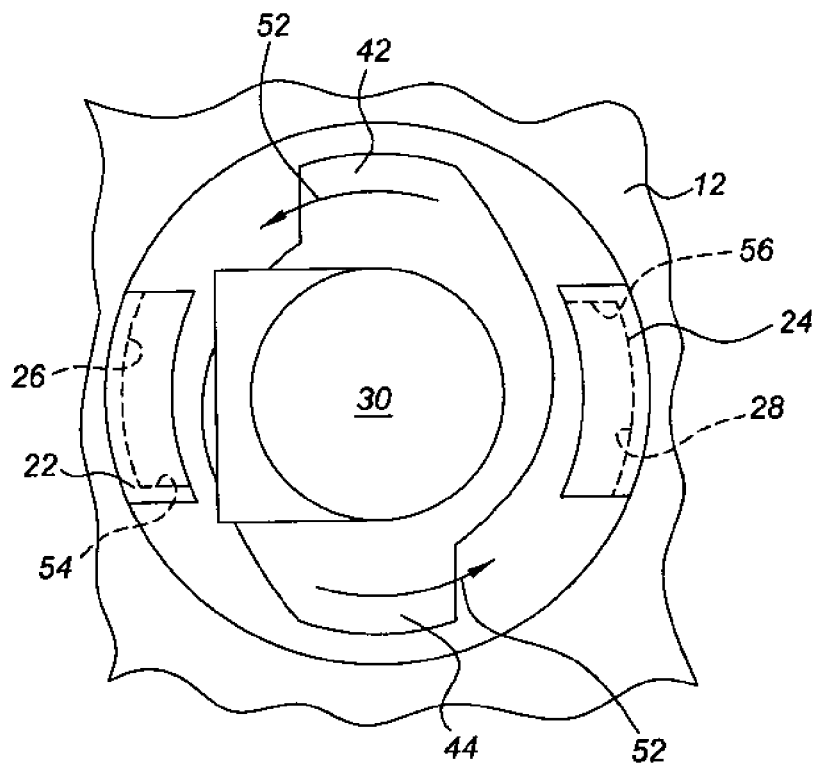
FIG. 2 is a schematic top view of a portion of the intake manifold and a pipe fitting of the pipe fitting assembly of FIG. 1, illustrating the pipe fitting in a first position.
Figure 3:
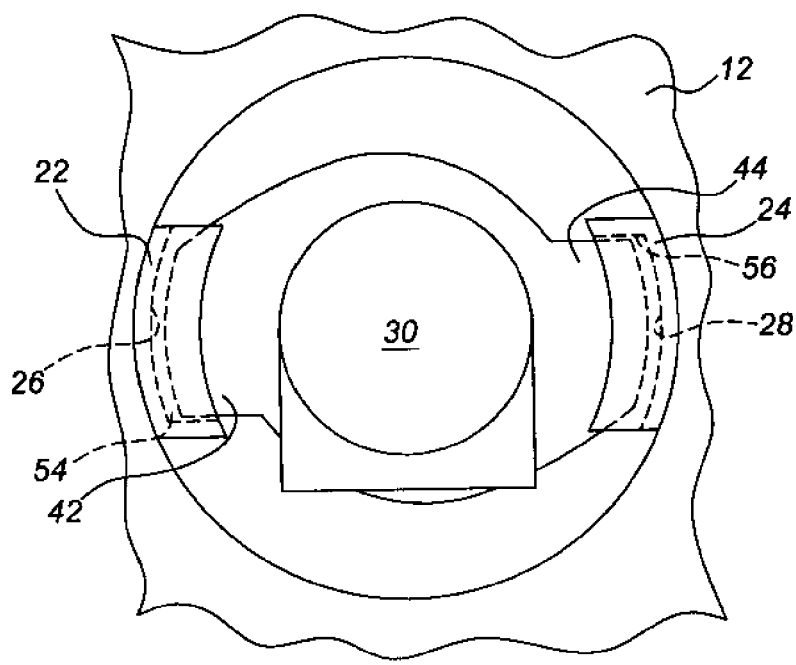
FIG. 3 is a schematic top view of a portion of the intake manifold and the pipe fitting of FIG. 2, illustrating the pipe fitting in a second position.

Referring to FIGS. 2 and 3, there is shown a top view of a portion of the intake manifold 12 having the pipe fitting 30 mounted thereto. FIG. 2 illustrates the pipe fitting 30 in a first position. In the first position, the pipe fitting 30 may be readily removed or separated from the intake manifold 12 through axial displacement. By clocking or rotating the pipe fitting 30 in the counter-clockwise direction, as indicated by arrows 52, the pipe fitting is moved from the first position to a second position, as shown in FIG. 3. With the pipe fitting 30 in the second position, the first and second flanges 42 and 44 engage a respective first and second groove 26 and 28. The rotation of the pipe fitting 30 into the second position is limited by stops 54 and 56 operable to engage a respective first and second flange 42 and 44. With the first flange 42 in engagement with the first groove 26 and the second flange 44 in engagement with the second groove 28, axial movement of the pipe fitting 30 with respect to the intake manifold 12 is substantially prevented. Additionally, in the case of over-pressurization of the intake manifold 12, such as by backfire, the first and second tabs 22 and 24 are operable to retain the pipe fitting 30 with respect to the intake manifold 12. The first and second tabs 22 and 24, as well as the first and second flanges 42 and 44 may be characterized as lacking a locking feature operable to prevent the rotation of the pipe fitting 30 from the second position to the first position.

Referring to FIGS. 1 through 3, to assemble or mount the pipe fitting assembly 14 with respect to the intake manifold 12, the generally cylindrical portion 40 of the pipe fitting 30 is inserted into the generally cylindrical bore 20 of the intake manifold. The pipe fitting 30 is then clocked or rotated from the first position, shown in FIG. 2 to the second position shown in FIG. 3. In doing so, axial displacement of the pipe fitting 30 with respect to the intake manifold is prevented. Subsequently, the quick-connect fitting 32 is mounted or attached to the intake manifold 12 via the fitting 48. By fixing or anchoring the second end portion 38 of the tube 34 with respect to the intake manifold 12, the tube 34 substantially prevents the rotation of the pipe fitting 30 with respect to the intake manifold 12, thereby maintaining the pipe fitting 30 in the second position.

The "clock and anchor" mounting nature of the pipe fitting assembly 14 provides benefits over traditional "clock and lock" mounting strategies since the simpler design contains no "lock", "retain", and "unlock" features. Therefore, the pipe fitting assembly is easier to install since there is no "retain" force to overcome to engage the "lock" function during assembly.

While the best modes for carrying out the invention have been described in detail, those familiar with the art to which this invention relates will recognize various alternative designs and embodiments for practicing the invention within the scope of the appended claims.

The invention claimed is:

1. A pipe fitting assembly for a component defining a generally cylindrical bore and having at least one tab portion defining at least one groove, the pipe fitting assembly comprising:
    a fitting member having a generally cylindrical portion configured for insertion into the generally cylindrical bore such that said fitting member is rotatable between a first and second position;
    at least one flange formed on said fitting member and operable to engage the at least one groove when said fitting member is rotated from said first position to said second position to prevent the removal of said generally cylindrical portion from the generally cylindrical bore;
    a tube member having a first end mounted with respect to said fitting member and a second end operable to anchor said tube member; and
    wherein said tube member is operable to retain said fitting member in said second position when said second end is anchored.

2. The pipe fitting assembly of claim 1, wherein the component is an intake manifold for an internal combustion engine.

3. The pipe fitting assembly of claim 1, wherein said second end of said tube member includes a quick connect fitting.

4. The pipe fitting assembly of claim 1, wherein said tube member is formed from plastic.

5. The pipe fitting assembly of claim 1, wherein the component is an intake manifold for an internal combustion engine and wherein said tube member is operable to convey evaporative emission gases to said fitting member.

6. An intake manifold assembly for an internal combustion engine comprising:
    an intake manifold defining a generally cylindrical bore;
    at least one tab portion defining at least one groove;
    a fitting member having a generally cylindrical portion configured for insertion into said generally cylindrical bore such that said fitting member is rotatable between a first and second position;
    at least one flange formed on said fitting member and operable to engage the at least one groove when said fitting member is rotated from said first position to said second position to prevent the removal of said generally cylindrical portion from the generally cylindrical bore;
    a tube member having a first end mounted with respect to said fitting member and a second end mounted with respect to one of said intake manifold and another component; and
    wherein said tube member is operable to retain said fitting member in said second position.

7. The intake manifold assembly of claim 6, wherein said second end of said tube member includes a quick connect fitting.

8. The intake manifold assembly of claim 6, wherein said tube member is operable to convey evaporative emission gases to said fitting member.

9. The intake manifold assembly of claim 6, wherein said generally cylindrical portion of said fitting member extends into a plenum portion of said intake manifold.

10. A method of retaining a pipe fitting with respect to a component defining a generally cylindrical bore, the method comprising:
    inserting a generally cylindrical portion of the pipe fitting into the generally cylindrical bore;
    rotating the pipe fitting from a first position to a second position such that at least one flange formed on the pipe fitting engages at least one grove defined by a tab member generally adjacent to the generally cylindrical bore to prevent the removal of said generally cylindrical portion from the generally cylindrical bore;
    mounting an end of a tube member with respect to the component, wherein another end of said tube member is mounted with respect to the pipe fitting; and
    wherein said tube member is operable to retain the pipe fitting with respect to the component by substantially preventing the rotation of the pipe fitting from said second position to said first position.

11. The method of claim 10, wherein the component is an intake manifold for an internal combustion engine.

12. The method of claim 10, wherein mounting said end of said tube member with respect to the component includes attaching a quick connect fitting to the component.

* * * * *